United States Patent [19]

Hayashi

[11] 4,278,160
[45] Jul. 14, 1981

[54] VISCOUS FLUID COUPLING

[75] Inventor: Masaharu Hayashi, Toyota, Japan

[73] Assignee: Aisin Seiki Kabushiki Kaisha, Kariya, Japan

[21] Appl. No.: 77,280

[22] Filed: Sep. 20, 1979

[30] Foreign Application Priority Data

Sep. 21, 1978 [JP] Japan .................. 53-116322

[51] Int. Cl.³ ................ F16D 35/00; F16D 43/25
[52] U.S. Cl. ..................... 192/82 T; 73/363.7;
192/58 B; 236/101 D; 267/156
[58] Field of Search ............. 192/58 B, 82 T;
73/363.7; 236/101 D; 261/39 B; 251/11;
123/185 BA; 185/45; 267/156

[56] References Cited

U.S. PATENT DOCUMENTS

| | | | |
|---|---|---|---|
| 1,511,204 | 10/1924 | Aseltine | 73/363.7 X |
| 2,043,834 | 6/1936 | Marbury | 73/363.7 X |
| 2,282,376 | 5/1942 | Phillips | 236/101 D X |
| 2,501,060 | 3/1950 | Leibing | 261/39 B X |
| 3,174,600 | 3/1965 | Oldberg | 192/58 B |
| 3,306,277 | 2/1967 | Gudmundsen | 123/185 BA |
| 3,393,707 | 7/1968 | Whiting | 267/156 X |
| 3,858,566 | 1/1975 | Perry | 123/185 BA X |
| 4,116,316 | 9/1978 | Streeter | 192/82 T X |
| 4,134,484 | 1/1979 | Lansinger | 192/58 B |

*Primary Examiner*—Allan D. Herrmann
*Attorney, Agent, or Firm*—Finnegan, Henderson, Farabow, Garrett & Dunner

[57] ABSTRACT

A viscous fluid coupling for connecting a cooling fan to an engine radiator including a rotatable casing having a fluid operating chamber and a fluid reservoir chamber therein, the chambers being in fluid communication one with the other; a rotor located in the fluid operating chamber and being rotatable relative to the casing; valve means operable to control fluid communication between the chambers; and a bimetal coil on the exterior of the casing, the inner end of the coil being operatively connected to the valve means and the outer end of the coil being pivotally connected to the casing.

1 Claim, 5 Drawing Figures

VISCOUS FLUID COUPLING

BACKGROUND OF THE INVENTION

1. Field of the Invention

The present invention relates to a viscous fluid coupling for connecting the engine of an automotive vehicle to a cooling fan for the engine radiator, and more particularly to a viscous fluid coupling of the temperature responsive type in which a bimetal coil located on the exterior of a rotatable casing operates a valve for controlling the flow of viscous fluid within the casing in response to the temperature of air flowing through the engine radiator.

2. Description of the Prior Art

In conventional temperature responsive viscous fluid couplings of this type, a bimetal coil is located on the exterior of a rotatable casing connected to a cooling fan. The bimetal coil is responsive to the temperature of air flowing through the engine radiator, and has an inner end operatively connected to a valve for controlling the flow of viscous fluid within the casing. An outer end extends radially outwardly and is fixedly or slidably received within a radial slot formed in the casing or a holder fixed to the casing. In this arrangement, stress concentrations arise in the bent portion defining the outer end, and in the coiled portion of the bimetal coil when the bimetal coil resonates to the torsional vibration transmitted from an engine to the casing. These stress concentrations can cause breakage of the bimetal coil. In addition, the resonance of the bimetal coil causes radial displacement of the outer end of the bimetal coil or wear on the outer end of the bimetal coil which, in turn, causes an objectionable varying of the temperature responsive characteristics of the coupling.

Accordingly, it is a primary object of this invention to reduce the amount of vibrational resonance in the bimetal coil of a viscous fluid coupling.

It is a further object of the present invention to improve the connection between the outer end of a bimetal coil in a viscous fluid coupling and a rotatable casing by pivotally connecting the bimetal coil to the casing.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects and in accordance with the purpose of the invention, as embodied and broadly described herein, the viscous fluid coupling of this invention comprises a rotatable casing having a fluid operating chamber and a fluid reservoir chamber therein, the chambers being in fluid communication one with the other; a rotor located in the fluid operating chamber, the rotor being rotatable relative to the casing; valve means operable to control fluid communication between the fluid operating chamber and the fluid reservoir chamber; and a bimetal coil on the exterior of the casing, the inner end of the bimetal coil being operatively connected to the valve means, and the outer end of the bimetal coil being pivotally connected to the casing.

Preferably, the bimetal coil includes an outer extreme end bent in a circular shape for pivotal connection between the bimetal coil and the casing. It is also preferred that the outer extreme end of the bimetal coil be connected to the casing by a connecting pin, the pin being rotatably press-fitted on the interior of the outer extreme end, and fixed to the casing.

BRIEF DESCRIPTION OF THE DRAWINGS

The accompanying drawings, which are incorporated in and constitute a part of this specification, illustrate one embodiment of the invention and, together with the description, serve to explain the principles of the invention.

Of the drawings.

DETAILED DESCRIPTION OF THE PREFERRED EMBODIMENT

Reference will now be made in detail to the present preferred embodiment of the invention, an example of which is illustrated in the accompanying drawings.

Figure 1:
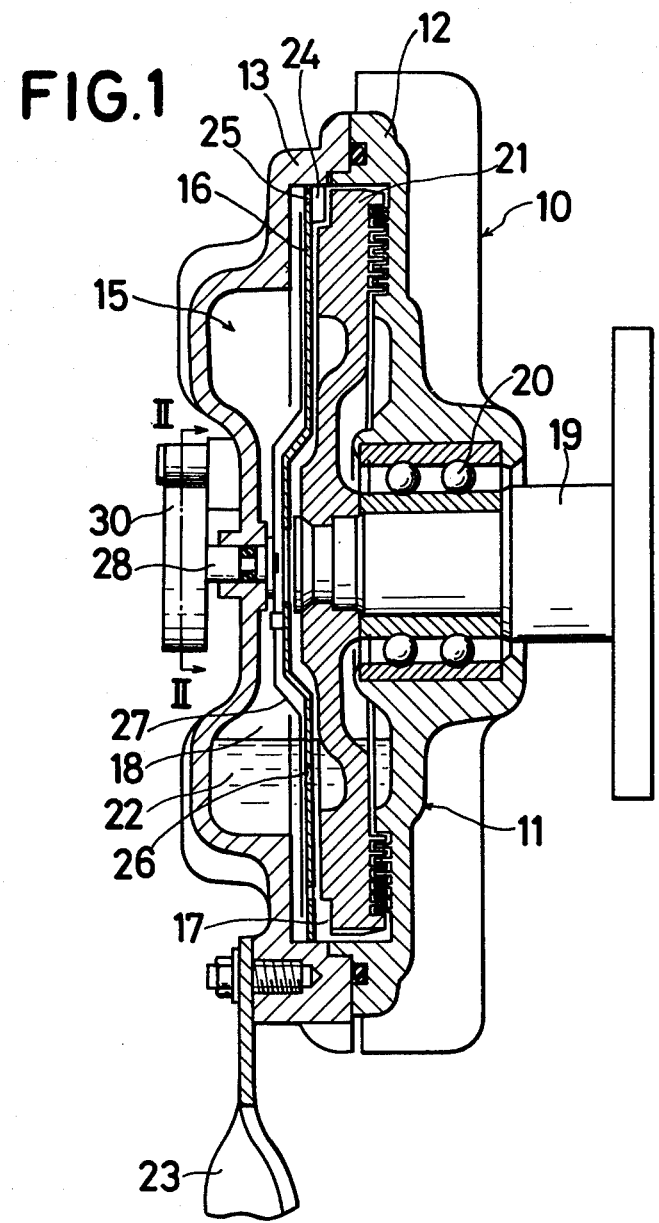
FIG. 1 is a longitudinal sectional view of one embodiment of a viscous fluid coupling according to the present invention.
Figure 2:
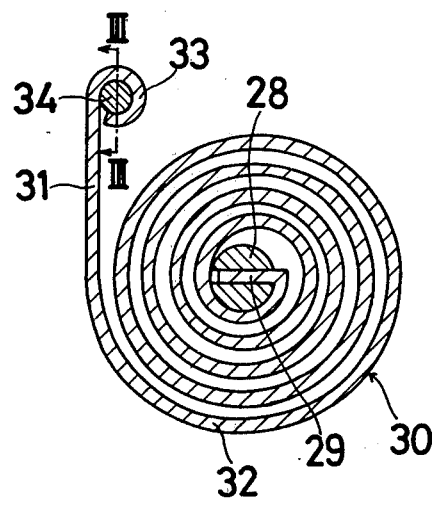
FIG. 2 is a sectional view taken along line II—II in FIG. 1.
Figure 3:
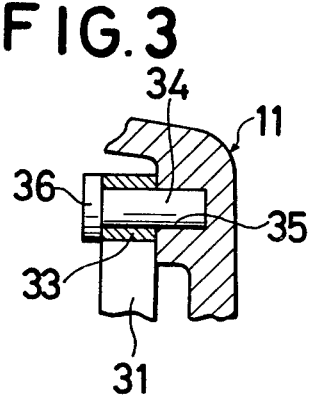
FIG. 3 is a sectional view taken along line III—III in FIG. 2.

Referring to FIGS. 1 to 3, the viscous fluid coupling of the present invention includes a rotatable casing having a fluid operating chamber and a fluid reservoir chamber therein, the chambers being in fluid communication one with the other. As here embodied, a viscous fluid coupling 10 comprises a casing 11 including a body member 12. A cover member 13 is sealingly fixed to the body member 12 and defines a cavity 15 which is divided by a dividing plate 16. The dividing plate 16 is fixed to the casing 11 and divides the cavity 15 into a fluid operating chamber 17 and a fluid reservoir chamber 18. An input shaft 19 mounted on an engine (not shown) and driven by the engine is supported for rotation on the casing 11 by a bearing 20.

In order to vary the fluid volume in the operating chamber 17 in response to the temperature of air flow through the engine radiator (not shown) the dividing plate 16 is provided with a pump element 24, a discharge passage 25 and an inlet passage 26. The pump element 24 acts to pump out the fluid in the operating chamber 17 into the reservoir chamber 18 through the discharge passage 25 upon the rotation of the coupling 10. The inlet passage 26 permits the fluid flow from the reservoir chamber 18 into the operating chamber 17.

The coupling includes a rotor located in the fluid operating chamber, the rotor being rotatable relative to the casing. As here embodied, a rotor 21 is fixed to one end of the input shaft 19 and is located within the fluid operating chamber 17. Viscous fluid 22 is provided within the cavity 15 to transfer the torque from the rotor 21 to the casing 11. Such torque transfer is well known in the art and is accomplished by viscous shear between the mating surfaces of the rotor 21 and the casing 11. The magnitude of the torque transferred from the rotor 21 to the casing 11 is a function of the fluid volume in the operating chamber 17. A cooling fan 23 is fixed to the casing 11.

The coupling also includes valve means operable to control fluid communication between the fluid operating chamber and the fluid reservoir chamber. As here embodied, the valve means includes a valve 27 for controlling the fluid flow passing through inlet passage 26 thereby varying the fluid volume in the operating chamber 17. The valve 27 is made of a suitable material and interacts with a seat located in the reservoir chamber 18. The valve 27 acts to open or close the inlet passage 26 by rotational movement thereof. The valve 27 is fixed to an inner end of a valve shaft 28 which is rotatably and sealingly mounted on the casing 11.

In accordance with the invention, the coupling includes a bimetal coil located on the exterior of the casing, the bimetal coil being operatively connected at an inner end thereof to the valve means and being pivotally connected to the casing at an outer end thereof. As here embodied, a bimetal coil 30 has an inner end 29 fixedly connected to an outer end of valve shaft 28. The coil 30 is located on the exterior of the casing 11 and acts to rotate the valve shaft 27 in response to the temperature of the air flow in the engine radiator.

Preferably, the bimetal coil includes an outer extreme end bent in a circular shape for pivotal connection to the casing. As here embodied, the bimetal coil 30 includes an outer end 31 having an extreme end 33 thereon, the extreme end 33 being bent in a circular shape.

It is also preferred that the outer extreme end of the bimetal coil be connected to the casing by a connecting pin, the pin being rotatably press-fitted on the interior of the outer extreme end, and fixed to the casing. Preferably also, the outer extreme end of the bimetal coil is fixedly press-fitted into an opening formed in the casing. As here embodied, a connecting pin 34 is rotatably press-fitted into the extreme end 33 of the bimetal coil 30 and fixedly press-fitted into an opening 35 formed in the casing 11. The connecting pin 34 is provided with a flange 36 which retains the extreme end 33 on the connecting pin 34. Thus, the bimetal coil 30 is pivotally connected at outer end 31 to the casing 11. Such a pivotal connection between the outer end 31 of the bimetal coil 30 and the casing 11 absorbs the stress concentrations in the bimetal coil 30 when the bimetal coil 30 resonates in response to the torsional vibration from the engine, and prevents the extreme end 33 of the bimetal coil 30 from the displacing on the casing 11. In addition, such pivotal connection provides accurate positioning of the extreme end 33 of the bimetal coil 30 on the casing 11 upon the assembling of the coupling 10.

The outer end of the bimetal coil may also be extended in a tangential direction. As here embodied, the outer end 31 tangentially extends from the coiled portion 32. The tangential extension of the outer end 31 of the bimetal coil 30 is useful to prevent the bimetal coil 30 from developing stress concentrations therein. It should be noted that the outer end 31 of the bimetal coil 30 also may be extended in a radial direction with a gentle bend.

Figure 4:
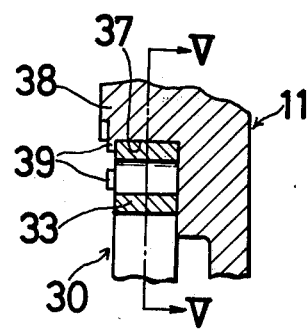
FIG. 4 is a view similar to FIG. 3, but showing an alternative embodiment of the pivotal connected between the outer end of a bimetal coil and a rotatable casing.
Figure 5:
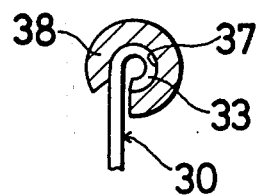
FIG. 5 is a reduced sectional view taken along line V—V in FIG. 4.

Referring to FIGS. 4 and 5, there is shown a modification relative to an alternative embodiment of the pivotal connection between the outer end of the bimetal coil and the casing. The outer extreme end 33 of the bimetal coil 30 is bent in a circular shape and is rotatably press-fitted into an opening 37 formed in a projection 38 provided on the casing 11. Pawls 39 are formed on the projection 38 by corking after the press-fitting of the extreme end 33. The pawls 39 retain the extreme end 33 in the opening 37.

Obviously, many modifications and variations of the present invention are possible in light of the above. It is, therefore, to be understood that within the scope of the appended claims, the invention may be practicable otherwise than as specifically described herein.

What is claimed is:

1. A viscous fluid coupling comprising:
   a rotatable casing provided with a fluid operating chamber and a fluid reservoir chamber therein, said chambers being in fluid communication one with the other;
   a rotor located in said fluid operating chamber, the rotor being rotatable relative to said casing,
   valve means operable to control fluid communication between said fluid operating chamber and said fluid reservoir chamber, and
   a bimetal coil located on the exterior of said casing, the inner end of said bimetal coil being operatively connected to said valve means and the outer end of the bimetal coil being pivotally connected to said casing, said bimetal coil including an outer extreme end bent in a circular shape for pivotal connection between said bimetal coil and said casing, the outer extreme end of said bimetal coil being fixedly press-fitted in an opening formed in said casing.

* * * * *